US008976541B2

(12) United States Patent
Ballard (10) Patent No.: US 8,976,541 B2
(45) Date of Patent: Mar. 10, 2015

(54) ELECTRICAL POWER AND DATA DISTRIBUTION APPARATUS

(75) Inventor: Claudio R. Ballard, Fort Lauderdale, FL (US)

(73) Assignee: Potens IP Holdings LLC, Fort Lauderdale, FL (US)

( * ) Notice: Subject to any disclaimer, the term of this patent is extended or adjusted under 35 U.S.C. 154(b) by 362 days.

(21) Appl. No.: 13/599,994

(22) Filed: Aug. 30, 2012

(65) Prior Publication Data

US 2013/0058012 A1   Mar. 7, 2013

Related U.S. Application Data

(60) Provisional application No. 61/529,580, filed on Aug. 31, 2011.

(51) Int. Cl.
H01R 9/00 (2006.01)
H02G 3/18 (2006.01)

(52) U.S. Cl.
CPC ........................................ *H02G 3/18* (2013.01)
USPC ............................ 361/823; 361/822; 361/826

(58) Field of Classification Search
USPC ............................ 361/821–827; 439/535–536
See application file for complete search history.

(56) References Cited

U.S. PATENT DOCUMENTS

| 1,149,583 | A | 8/1915 | Hutchison |
| 1,162,421 | A | 11/1915 | Welch |
| 1,205,371 | A | 11/1916 | Marshall |
| 1,267,079 | A | 5/1918 | Jensen |
| 1,308,495 | A | 7/1919 | Johnson |
| D58,530 | S | 8/1921 | Anibal |
| 1,461,457 | A | 7/1923 | Rice |
| 1,594,993 | A | 8/1926 | Bedford |
| 1,663,026 | A | 3/1928 | Schultze |
| 1,828,608 | A | 10/1931 | Mack |

(Continued)

FOREIGN PATENT DOCUMENTS

| CN | 1393092 A | 1/2003 |
| CN | 1656430 A | 8/2005 |

(Continued)

OTHER PUBLICATIONS

PCT: International Search Report and Written Opinion of PCT/US2010/041231 (related application); Apr. 21, 2011; 9 pgs.
PCT: International Preliminary Report on Patentability of PCT/US2009/059073 (related application); Apr. 14, 2011.
Ethernet over twisted pair; Wikipedia, the free encyclopedia; Jun. 3, 2008; pp. 1-3; available at http://en.wikipedia.org/wiki/Ethernet_over_twisted_pair.

(Continued)

*Primary Examiner* — Tuan T Dinh
(74) *Attorney, Agent, or Firm* — Howison & Arnott, L.L.P.

(57) ABSTRACT

An electrical power and data distribution apparatus comprises an enclosure having a rear connector configured to connect to a first cable including electrical power and data conductors, a front connector configured to connect to a second cable including electrical and data conductors, at least one electrical power outlet configured to connect to a power plug and at least one data input/output connector configured to connect to a device having a predetermined connection configuration. A power hub is connected to the rear connector to receive electrical power, and to the front connector and the power outlet to supply electrical power. The data conductors of the front and rear connectors are connected to a network interface of a controller for sending and receiving data with a first protocol, and the data input/output connector is connected to an input/output section of the controller for sending and receiving data with a second protocol.

8 Claims, 8 Drawing Sheets

(56) References Cited

U.S. PATENT DOCUMENTS

| | | |
|---|---|---|
| 1,848,064 A | 3/1932 | Oishei |
| 1,908,503 A | 5/1933 | Day et al. |
| 2,009,591 A | 7/1935 | Radford |
| 2,026,444 A | 12/1935 | Trott |
| 2,046,779 A | 7/1936 | Hack |
| 2,136,472 A | 11/1938 | Sinclair |
| 2,151,976 A | 3/1939 | Eduard |
| 2,180,731 A | 11/1939 | Dickinson |
| 2,229,192 A | 1/1941 | Schultz |
| 2,230,906 A | 2/1941 | Poe Potts |
| 2,235,716 A | 3/1941 | Lucius |
| 2,256,170 A | 9/1941 | Powers |
| 2,496,700 A | 2/1950 | Cole |
| 2,728,230 A | 12/1955 | Haramic |
| 2,786,359 A | 3/1957 | Karlan et al. |
| 2,801,118 A | 7/1957 | Amesbury |
| 2,881,860 A | 4/1959 | Ternes |
| 2,897,916 A | 8/1959 | Probst |
| 3,133,741 A | 5/1964 | Garabello |
| 3,259,684 A | 7/1966 | Wakefield |
| 3,264,892 A | 8/1966 | Boman et al. |
| 3,269,208 A | 8/1966 | Whitchurch |
| 3,279,834 A | 10/1966 | Budzynski |
| 3,323,609 A | 6/1967 | Rosenberger et al. |
| 3,351,364 A | 11/1967 | Warn et al. |
| 3,433,891 A | 3/1969 | Zysk et al. |
| 3,435,701 A | 4/1969 | Bucher |
| 3,440,897 A | 4/1969 | Dutt et al. |
| 3,482,465 A | 12/1969 | Lusted |
| 3,641,746 A | 2/1972 | Smith et al. |
| 3,691,525 A | 9/1972 | McClellan, Sr. et al. |
| 3,795,760 A | 3/1974 | Raw et al. |
| 3,800,910 A | 4/1974 | Rose |
| 3,831,209 A | 8/1974 | Clingman |
| 4,025,896 A | 5/1977 | Hintze et al. |
| 4,061,054 A | 12/1977 | Wenninger |
| 4,135,593 A | 1/1979 | Fowkes |
| 4,138,160 A | 2/1979 | Lohmeyer |
| 4,236,274 A | 12/1980 | Omote et al. |
| 4,266,438 A | 5/1981 | Kessmar |
| 4,331,209 A | 5/1982 | Bauer et al. |
| 4,333,360 A | 6/1982 | Simmons |
| 4,354,458 A | 10/1982 | Bury |
| 4,441,382 A | 4/1984 | Snooks |
| 4,515,393 A | 5/1985 | Sauter |
| 4,519,268 A | 5/1985 | Oda |
| 4,548,166 A | 10/1985 | Gest |
| 4,558,955 A | 12/1985 | Herchenbach |
| 4,561,325 A | 12/1985 | Jester |
| 4,562,895 A | 1/1986 | Kirchweger |
| 4,569,245 A | 2/1986 | Feldt et al. |
| 4,590,339 A | 5/1986 | Scott-Jackson et al. |
| 4,591,211 A | 5/1986 | Browning et al. |
| 4,597,306 A | 7/1986 | Tsuji |
| 4,646,864 A | 3/1987 | Racchi |
| 4,707,788 A | 11/1987 | Tashiro et al. |
| 4,742,884 A | 5/1988 | Ishikawa |
| 4,747,636 A | 5/1988 | Harasaki et al. |
| 4,770,522 A | 9/1988 | Alten |
| 4,771,368 A | 9/1988 | Tsukamoto et al. |
| 4,772,299 A | 9/1988 | Bogusz |
| 4,778,029 A | 10/1988 | Thornburgh |
| 4,787,257 A | 11/1988 | Ott et al. |
| 4,807,490 A | 2/1989 | Foggini |
| 4,816,730 A | 3/1989 | Wilhelm et al. |
| 4,825,669 A | 5/1989 | Herrera |
| 4,957,071 A | 9/1990 | Matsuo et al. |
| 4,987,522 A | 1/1991 | Miyano et al. |
| 5,016,578 A | 5/1991 | Ogawa et al. |
| 5,022,479 A | 6/1991 | Kiser et al. |
| 5,048,471 A | 9/1991 | Takii et al. |
| 5,056,376 A | 10/1991 | Moroto et al. |
| 5,064,247 A | 11/1991 | Clark et al. |
| 5,066,062 A | 11/1991 | Sekulovski |
| 5,121,818 A | 6/1992 | McComic |
| 5,133,750 A | 7/1992 | Momose et al. |
| 5,149,915 A | 9/1992 | Brunker et al. |
| 5,156,198 A | 10/1992 | Hall |
| 5,161,513 A | 11/1992 | Feldinger |
| 5,195,092 A | 3/1993 | Wilson et al. |
| 5,236,219 A | 8/1993 | Jambor et al. |
| 5,304,739 A | 4/1994 | Klug et al. |
| 5,313,853 A | 5/1994 | Olmsted et al. |
| 5,317,880 A | 6/1994 | Spears |
| 5,322,340 A | 6/1994 | Sato et al. |
| 5,348,706 A | 9/1994 | Abul-Haj et al. |
| 5,349,328 A | 9/1994 | Lonzame |
| 5,352,026 A | 10/1994 | Snook |
| 5,416,777 A | 5/1995 | Kirkham |
| 5,431,485 A | 7/1995 | Hayashi |
| 5,492,391 A | 2/1996 | Snook |
| 5,517,173 A | 5/1996 | Cha et al. |
| 5,519,588 A | 5/1996 | Sobeck et al. |
| 5,533,794 A | 7/1996 | Faison |
| 5,557,698 A | 9/1996 | Gareis et al. |
| 5,584,537 A | 12/1996 | Miansian |
| 5,603,283 A | 2/1997 | Owen |
| 5,613,012 A | 3/1997 | Hoffman et al. |
| 5,615,277 A | 3/1997 | Hoffman |
| 5,618,323 A | 4/1997 | Shearn et al. |
| 5,626,057 A | 5/1997 | Nishigai et al. |
| 5,635,903 A | 6/1997 | Koike et al. |
| 5,637,933 A | 6/1997 | Rawlings et al. |
| 5,641,193 A | 6/1997 | Zepnik et al. |
| 5,660,243 A | 8/1997 | Anzalone et al. |
| 5,694,259 A | 12/1997 | Brandin |
| 5,702,150 A | 12/1997 | Reuter et al. |
| 5,734,238 A | 3/1998 | Yanagisawa et al. |
| 5,738,369 A | 4/1998 | Durrani |
| 5,745,027 A | 4/1998 | Malville |
| 5,770,797 A | 6/1998 | Lapohn |
| 5,794,733 A | 8/1998 | Stosel et al. |
| 5,802,922 A | 9/1998 | Kawai et al. |
| 5,808,374 A | 9/1998 | Miller et al. |
| 5,820,224 A | 10/1998 | Dimatteo, Jr. |
| 5,821,466 A | 10/1998 | Clark et al. |
| 5,853,857 A | 12/1998 | Mahmood et al. |
| 5,870,723 A | 2/1999 | Pare, Jr. et al. |
| 5,883,334 A | 3/1999 | Newmoyer et al. |
| 5,896,778 A | 4/1999 | Murakami et al. |
| 5,899,521 A | 5/1999 | Pfertner et al. |
| 5,910,988 A | 6/1999 | Ballard |
| 5,934,744 A | 8/1999 | Jergens et al. |
| 5,941,105 A | 8/1999 | Macey |
| D416,525 S | 11/1999 | Sacco et al. |
| 5,988,238 A | 11/1999 | Palvolgyi |
| 6,011,548 A | 1/2000 | Thacker |
| 6,028,537 A | 2/2000 | Suman et al. |
| 6,032,137 A | 2/2000 | Ballard |
| 6,053,043 A | 4/2000 | Dannenberg et al. |
| 6,056,075 A | 5/2000 | Kargilis |
| 6,092,898 A | 7/2000 | De Juan, Jr. |
| 6,116,700 A | 9/2000 | Herrera |
| 6,178,917 B1 | 1/2001 | Jansa |
| 6,182,807 B1 | 2/2001 | Saito et al. |
| 6,198,244 B1 | 3/2001 | Hayden et al. |
| 6,205,880 B1 | 3/2001 | Deidewig et al. |
| D440,918 S | 4/2001 | Pfeiffer |
| 6,212,989 B1 | 4/2001 | Beyer et al. |
| 6,234,555 B1 | 5/2001 | Emmerich et al. |
| 6,234,557 B1 | 5/2001 | Bae |
| 6,253,131 B1 | 6/2001 | Quigley et al. |
| 6,253,716 B1 | 7/2001 | Palmer et al. |
| 6,262,982 B1 | 7/2001 | Donahue et al. |
| 6,263,447 B1 | 7/2001 | French et al. |
| 6,269,348 B1 | 7/2001 | Pare, Jr. et al. |
| 6,282,658 B2 | 8/2001 | French et al. |
| 6,302,228 B1 | 10/2001 | Cottereau et al. |
| 6,308,205 B1 | 10/2001 | Carcerano et al. |
| 6,315,326 B1 | 11/2001 | Muller et al. |
| 6,321,339 B1 | 11/2001 | French et al. |
| 6,322,158 B1 | 11/2001 | Herrera |
| 6,357,563 B1 | 3/2002 | Hayford et al. |
| 6,366,682 B1 | 4/2002 | Hoffman et al. |

(56) References Cited

U.S. PATENT DOCUMENTS

| | | |
|---|---|---|
| 6,397,198 B1 | 5/2002 | Hoffman et al. |
| 6,411,728 B1 | 6/2002 | Lee et al. |
| 6,438,472 B1 | 8/2002 | Tano et al. |
| 6,441,510 B1 | 8/2002 | Hein et al. |
| 6,463,901 B1 | 10/2002 | Cuddihee et al. |
| 6,479,973 B2 | 11/2002 | Saito et al. |
| 6,514,136 B1 | 2/2003 | Hanaya et al. |
| 6,525,998 B1 | 2/2003 | Taylor et al. |
| D471,139 S | 3/2003 | Wyszogrod et al. |
| 6,533,466 B1 | 3/2003 | Smith |
| 6,564,661 B2 | 5/2003 | DeJonge |
| D481,337 S | 10/2003 | Hartono et al. |
| 6,669,275 B2 | 12/2003 | Frasher et al. |
| 6,679,215 B2 | 1/2004 | Benson et al. |
| 6,693,523 B1 | 2/2004 | Abel et al. |
| 6,718,842 B1 | 4/2004 | Bofias |
| D492,629 S | 7/2004 | Hartono et al. |
| 6,780,047 B1 | 8/2004 | Laity |
| 6,782,862 B2 | 8/2004 | Homi |
| 6,837,602 B1 | 1/2005 | Lee |
| 6,843,115 B2 | 1/2005 | Rutherford |
| 6,859,539 B1 | 2/2005 | Maeda |
| 6,882,917 B2 | 4/2005 | Pillar et al. |
| 6,889,516 B2 | 5/2005 | Sasaki et al. |
| 6,942,277 B2 | 9/2005 | Rangnekar et al. |
| 7,004,787 B2 | 2/2006 | Milan |
| 7,055,883 B2 | 6/2006 | Tokutomi et al. |
| 7,059,289 B2 | 6/2006 | Cunningham et al. |
| 7,066,630 B1 | 6/2006 | Venkatram |
| 7,068,158 B2 | 6/2006 | Komatsu et al. |
| 7,097,233 B2 | 8/2006 | Sogame et al. |
| 7,140,667 B2 | 11/2006 | Steinhauser et al. |
| 7,146,129 B2 | 12/2006 | Bostrom et al. |
| 7,159,486 B2 | 1/2007 | Thoreson et al. |
| 7,165,871 B2 | 1/2007 | Takeda et al. |
| D537,393 S | 2/2007 | Chanteloup |
| 7,206,672 B2 | 4/2007 | Mueller |
| 7,257,397 B2 | 8/2007 | Shamoon et al. |
| D551,604 S | 9/2007 | Kapffenstein |
| 7,266,435 B2 | 9/2007 | Wang et al. |
| 7,271,708 B2 | 9/2007 | Nakatani et al. |
| D551,971 S | 10/2007 | Hardwick |
| 7,313,467 B2 | 12/2007 | Breed et al. |
| D559,159 S | 1/2008 | Kazyaka et al. |
| D562,738 S | 2/2008 | Young |
| 7,341,278 B2 | 3/2008 | Queveau et al. |
| 7,350,273 B1 | 4/2008 | Skipper |
| 7,375,285 B2 | 5/2008 | Chiang |
| 7,377,344 B2 | 5/2008 | Barske |
| D571,268 S | 6/2008 | Hoffman |
| 7,387,414 B2 | 6/2008 | Helms et al. |
| 7,392,122 B2 | 6/2008 | Pillar et al. |
| 7,400,239 B2 | 7/2008 | Kiko et al. |
| D574,661 S | 8/2008 | Logan |
| D575,581 S | 8/2008 | Harris |
| D580,457 S | 11/2008 | Bender |
| D581,843 S | 12/2008 | Kluck |
| 7,483,952 B2 | 1/2009 | Light et al. |
| 7,494,178 B2 | 2/2009 | Nygaard |
| 7,523,683 B2 | 4/2009 | Jackson |
| D594,796 S | 6/2009 | Ballard et al. |
| 7,540,638 B2 | 6/2009 | Dassanayake et al. |
| 7,544,886 B2 | 6/2009 | Detian et al. |
| 7,547,077 B2 | 6/2009 | Melberg et al. |
| 7,585,031 B2 | 9/2009 | White et al. |
| D606,467 S | 12/2009 | Ballard et al. |
| 7,636,985 B2 | 12/2009 | Greenbank |
| 7,690,460 B2 | 4/2010 | Sakitani et al. |
| 7,703,961 B2 | 4/2010 | Yatsuda et al. |
| 7,725,732 B1 | 5/2010 | Ballard |
| 7,740,501 B2 | 6/2010 | Ballard et al. |
| 7,747,739 B2 | 6/2010 | Bridges et al. |
| 7,786,851 B2 | 8/2010 | Drew et al. |
| 7,866,859 B2 | 1/2011 | Suzuki et al. |
| 2001/0034671 A1 | 10/2001 | Luke et al. |
| 2002/0034301 A1 | 3/2002 | Andersson |
| 2002/0073507 A1 | 6/2002 | Presley |
| 2002/0082750 A1 | 6/2002 | Lamke et al. |
| 2002/0180579 A1 | 12/2002 | Nagaoka et al. |
| 2003/0011546 A1 | 1/2003 | Obata et al. |
| 2003/0015909 A1 | 1/2003 | Meek, Jr. |
| 2003/0206418 A1 | 11/2003 | Strazzanti |
| 2003/0225693 A1 | 12/2003 | Ballard et al. |
| 2004/0002794 A1 | 1/2004 | Pillar et al. |
| 2004/0019413 A1 | 1/2004 | Bonilla et al. |
| 2004/0043753 A1 | 3/2004 | Wake et al. |
| 2004/0075537 A1 | 4/2004 | Quigley et al. |
| 2004/0129197 A1 | 7/2004 | Nakagawa et al. |
| 2004/0155789 A1 | 8/2004 | Crews |
| 2004/0158723 A1 | 8/2004 | Root |
| 2004/0202006 A1 | 10/2004 | Pien |
| 2004/0202007 A1 | 10/2004 | Yagi et al. |
| 2005/0012607 A1 | 1/2005 | Sumiya et al. |
| 2005/0021190 A1 | 1/2005 | Worrell et al. |
| 2005/0105296 A1 | 5/2005 | French |
| 2005/0107928 A1 | 5/2005 | Mueller |
| 2005/0109145 A1 | 5/2005 | Levin et al. |
| 2005/0128751 A1 | 6/2005 | Roberge et al. |
| 2005/0140129 A1 | 6/2005 | Miki et al. |
| 2005/0141225 A1 | 6/2005 | Striebel |
| 2005/0155043 A1 | 7/2005 | Schulz et al. |
| 2005/0168071 A1 | 8/2005 | Durbin et al. |
| 2005/0190045 A1 | 9/2005 | Lesesky et al. |
| 2005/0234622 A1 | 10/2005 | Pillar et al. |
| 2005/0257613 A1 | 11/2005 | Spencer et al. |
| 2005/0264268 A1 | 12/2005 | Ueno |
| 2005/0280253 A1 | 12/2005 | Queveau et al. |
| 2006/0044825 A1 | 3/2006 | Sa |
| 2006/0053281 A1 | 3/2006 | Andersson |
| 2006/0066584 A1 | 3/2006 | Barkan |
| 2006/0097577 A1 | 5/2006 | Kato et al. |
| 2006/0097852 A1 | 5/2006 | Lammers et al. |
| 2006/0107784 A1 | 5/2006 | Bostic et al. |
| 2006/0162485 A1 | 7/2006 | Leng et al. |
| 2006/0187670 A1 | 8/2006 | Dalton et al. |
| 2006/0200781 A1 | 9/2006 | Obradovich |
| 2006/0212194 A1 | 9/2006 | Breed |
| 2006/0243191 A1 | 11/2006 | Verdouw |
| 2006/0244581 A1 | 11/2006 | Breed et al. |
| 2006/0256572 A1 | 11/2006 | Lin |
| 2006/0266273 A1 | 11/2006 | Westberg et al. |
| 2007/0001830 A1 | 1/2007 | Dagci et al. |
| 2007/0011227 A1 | 1/2007 | Johnson |
| 2007/0024117 A1 | 2/2007 | Boenker, IV et al. |
| 2007/0030137 A1 | 2/2007 | Masters et al. |
| 2007/0077058 A1 | 4/2007 | Kontani |
| 2007/0096546 A1 | 5/2007 | Thomas et al. |
| 2007/0137367 A1 | 6/2007 | Papa et al. |
| 2007/0147407 A1 | 6/2007 | Binder |
| 2007/0153406 A1 | 7/2007 | Matsumoto |
| 2007/0247291 A1 | 10/2007 | Masuda et al. |
| 2008/0002420 A1 | 1/2008 | Lambert et al. |
| 2008/0007961 A1 | 1/2008 | Mochizuki et al. |
| 2008/0031004 A1 | 2/2008 | Chu |
| 2008/0034209 A1 | 2/2008 | Dickinson et al. |
| 2008/0042822 A1 | 2/2008 | Wang |
| 2008/0060861 A1 | 3/2008 | Baur et al. |
| 2008/0080203 A1 | 4/2008 | Neufeglise |
| 2008/0157593 A1 | 7/2008 | Bax et al. |
| 2008/0173127 A1 | 7/2008 | Ackert et al. |
| 2008/0222844 A1 | 9/2008 | Broadhead et al. |
| 2009/0011639 A1 | 1/2009 | Ballard et al. |
| 2009/0016216 A1 | 1/2009 | Ballard et al. |
| 2009/0040029 A1 | 2/2009 | Bridges et al. |
| 2009/0051522 A1 | 2/2009 | Perkins |
| 2009/0091291 A1 | 4/2009 | Woody et al. |
| 2009/0126827 A1 | 5/2009 | Guendouz et al. |
| 2009/0161377 A1 | 6/2009 | Helms et al. |
| 2009/0200988 A1 | 8/2009 | Bridges et al. |
| 2009/0207602 A1 | 8/2009 | Reed et al. |
| 2009/0220013 A1 | 9/2009 | Butts et al. |
| 2009/0223318 A1 | 9/2009 | Ballard |
| 2009/0223437 A1 | 9/2009 | Ballard |
| 2009/0223438 A1 | 9/2009 | Ballard |

(56) References Cited

U.S. PATENT DOCUMENTS

| | | |
|---|---|---|
| 2009/0223757 A1 | 9/2009 | Ballard |
| 2009/0223789 A1 | 9/2009 | Ballard |
| 2009/0224895 A1 | 9/2009 | Ballard |
| 2009/0267405 A1 | 10/2009 | Ballard |
| 2009/0271949 A1 | 11/2009 | Sprague et al. |
| 2009/0272313 A1 | 11/2009 | Ballard et al. |
| 2009/0272589 A1 | 11/2009 | Ballard |
| 2009/0273170 A1 | 11/2009 | Ballard et al. |
| 2009/0273208 A1 | 11/2009 | Ballard et al. |
| 2009/0273282 A1 | 11/2009 | Ballard et al. |
| 2009/0273942 A1 | 11/2009 | Ballard et al. |
| 2009/0274416 A1 | 11/2009 | Ballard |
| 2009/0277707 A1 | 11/2009 | Ballard |
| 2009/0289062 A1 | 11/2009 | Ballard |
| 2009/0289757 A1 | 11/2009 | Ballard |
| 2010/0079997 A1 | 4/2010 | Morikawa et al. |
| 2010/0082277 A1 | 4/2010 | Ballard |
| 2010/0112850 A1* | 5/2010 | Rao et al. ............... 439/492 |
| 2010/0128479 A1 | 5/2010 | Biebl et al. |
| 2010/0208915 A1 | 8/2010 | Lipp |
| 2010/0301631 A1 | 12/2010 | Scott et al. |
| 2011/0068921 A1* | 3/2011 | Shafer ................... 340/571 |
| 2011/0176428 A1 | 7/2011 | Ballard et al. |

FOREIGN PATENT DOCUMENTS

| | | |
|---|---|---|
| DE | 19526809 A1 | 1/1997 |
| DE | 10311396 A1 | 9/2004 |
| DE | 102004053238 A1 | 5/2006 |
| EP | 0507225 A | 10/1992 |
| EP | 1233602 A1 | 4/2002 |
| EP | 1429348 A | 6/2004 |
| EP | 1493630 | 1/2005 |
| GB | 462033 A | 3/1937 |
| GB | 2203483 A | 10/1988 |
| JP | 1991 03-255263 A | 11/1991 |
| JP | 05-053594 A | 3/1993 |
| JP | 5-169981 A | 7/1993 |
| JP | 07-302093 A | 11/1995 |
| JP | 2000-357421 A | 12/2000 |
| JP | 2001-328494 | 11/2001 |
| JP | 2002-313144 A | 10/2002 |
| JP | 2003-106431 A | 4/2003 |
| JP | 2003123176 A | 4/2003 |
| JP | 2004-247259 A | 9/2004 |
| JP | 2004-249788 A | 9/2004 |
| JP | 2005-178427 A | 7/2005 |
| JP | 2007-010810 A | 1/2007 |
| JP | 2007-135022 | 5/2007 |
| KR | 2005-0018420 | 2/2005 |
| KR | 10-2010-0012866 A | 2/2010 |
| SU | 958180 | 9/1982 |
| WO | 03089998 A1 | 10/2003 |
| WO | 2005103627 A2 | 11/2005 |
| WO | 2007039723 A1 | 4/2007 |

OTHER PUBLICATIONS

PCT: International Search Report and Written Opinion of PCT/US2009/059073 (related application); Jan. 22, 2010; 7 pgs.
PCT: International Search Report and Written Opinion of PCT/US2009/045063 (related application); Aug. 12, 2009; 7 pgs.
PCT: International Search Report and Written Opinion of PCT/US2009/043649 (related application); Aug. 10, 2009; 8 pgs.
PCT: International Search Report and Written Opinion of PCT/US2009/036322 (related application); Jun. 11, 2009; 8 pgs.
PCT: International Search Report and Written Opinion of PCT/US2009/036234 (related application); Dec. 21, 2009; 6 pgs.
PCT: International Search Report and Written Opinion of PCT/US2009/036190 (related application); Jul. 15, 2009; 8 pgs.
PCT: International Search Report and Written Opinion of PCT/US2009/036078 (related application); Apr. 15, 2009; 7 pgs.
PCT: International Search Report and Written Opinion of PCT/US2009/036073 (related application); May 16, 2009; 8 pgs.
PCT: International Search Report and Written Opinion of PCT/US2009/036001 (related application); Apr. 14, 2009; 12 pgs.
PCT: International Search Report and Written Opinion of PCT/US2009/035850 (related application); Apr. 15, 2009; 9 pgs.
PCT: International Search Report and Written Opinion of PCT/US2009/035844 (related application); Apr. 23, 2009; 7 pgs.
PCT: International Search Report and Written Opinion of PCT/US2009/035715 (related application); Apr. 29, 2009; 8 pgs.
PCT: International Search Report and Written Opinion of PCT/US2009/035626 (related application); Jun. 3, 2009; 7 pgs.
PCT: International Search Report and Written Opinion of PCT/US2009/035625 (related application); May 25, 2009; 9 pgs.
PCT: International Search Report and Written Opinion of PCT/US2009/035615 (related application); Jul. 14, 2009; 7 pgs.
PCT: International Search Report and Written Opinion of PCT/US2009/035614 (related application); Aug. 21, 2009; 10 pgs.
PCT: International Preliminary Report on Patentability of PCT/IB2008/002056 (related application); Dec. 7, 2009.
PCT: International Preliminary Report on Patentability of PCT/IB2008/002060 (related application); Dec. 7, 2009.
PCT: International Search Report and Written Opinion of PCT/IB2008/002056 (related application); Jan. 7, 2009; 9 pgs.
PCT: International Search Report and Written Opinion of PCT/IB2008/002060 (related application); Feb. 16, 2009; 12 pgs.
Vanderwerp, Dave, "2011 Dodge Circuit EV—First Drive Review." Jun. 2009; pp. 1-4; available at http://www.caranddriver.com/reviews/car/09q2/2011_dodge_circuit_ev-first_drive_review.
PCT: International Search Report and Written Opinion of PCT/US2012/053368 (related application); Feb. 18, 2013; 9 pages.
PCT: International Preliminary Report on Patentability of PCT/US2009/036309 (related application); Feb. 23, 2012; 5 pages.
PCT: International Search Report and Written Opinion of PCT/US2009/035624 (related application); Feb. 16, 2012; 9 pages.
PCT: International Search Report and Written Opinion of PCT/US2011/041489 (related application); Feb. 9, 2012; 8 pgs.
PCT: International Preliminary Report on Patentability of PCT/US2009/035624 (related application); Feb. 16, 2012; 5 pgs.
PCT: International Search Report and Written Opinion of PCT/US2009/036302 (related application); Mar. 21, 2012; 14 pgs.
PCT: International Preliminary Report on Patentability of PCT/US2009/036302 (related application); Apr. 19, 2012; 6 pages.
PCT: International Search Report and Written Opinion of PCT/US2011/054123 (related application); Apr. 30, 2012; 7 pages.
PCT: International Preliminary Report on Patentability of PCT/US2011/041489 (related application); Jan. 10, 2013; 5 pages.
PCT: International Preliminary Report on Patentability of PCT/US2009/045063 (related application); Dec. 2, 2010.
PCT: International Preliminary Report on Patentability of PCT/US2009/043649 (related application); Nov. 25, 2010.
PCT: International Preliminary Report on Patentability of PCT/US2009/036322 (related application); Sep. 16, 2010.
PCT: International Preliminary Report on Patentability of PCT/US2009/036234 (related application); Sep. 7, 2010.
PCT: International Preliminary Report on Patentability of PCT/US2009/035844 (related application); Sep. 7, 2010.
PCT: International Preliminary Report on Patentability of PCT/US2009/036073 (related application); Sep. 7, 2010.
PCT: International Preliminary Report on Patentability of PCT/US2009/035850 (related application); Sep. 7, 2010.
PCT: International Preliminary Report on Patentability of PCT/US2009/036190 (related application); Sep. 7, 2010.
PCT: International Preliminary Report on Patentability of PCT/US2009/035626 (related application); Sep. 7, 2010.
PCT: International Preliminary Report on Patentability of PCT/US2009/035614 (related application); Sep. 7, 2010.
PCT: International Preliminary Report on Patentability of PCT/US2009/035715 (related application); Sep. 7, 2010.
PCT: International Preliminary Report on Patentability of PCT/US2009/036078 (related application); Sep. 7, 2010.

* cited by examiner

ELECTRICAL POWER AND DATA DISTRIBUTION APPARATUS

CROSS-REFERENCE TO RELATED APPLICATIONS

This application claims benefit of U.S. Provisional Application No. 61/529,580, filed Aug. 31, 2011, and entitled ELECTRICAL POWER AND DATA DISTRIBUTION APPARATUS.

TECHNICAL FIELD

The following disclosure relates the connection of devices to a data network, and in particular, to an apparatus for the distribution of electrical power and network communications to devices in a building, e.g., in a commercial or residential building.

BACKGROUND

Providing a unified network for handling both digital communications and electrical power distribution in a commercial or residential building is the goal of many developers. In particular, it is desired to simplify the connection of non-network enabled devices into a digital communication network. It is also desired to eliminate the requirement to provide separate wiring for electrical power (i.e., general-purpose alternating current electric power supply, also known as, e.g., "wall outlet power", "grid power" or "mains power") and network communications in a building.

U.S. Pat. No. 7,940,673 published as U.S. Patent Application Publication No. 2009/0016216 and entitled System For Integrating A Plurality Of Modules Using A Power/Data Backbone Network discloses an architecture for the modular connection of devices to a unified power/data network. U.S. Pat. No. 7,740,501 published as U.S. Patent Application Publication No. 2009/0011639 and entitled Hybrid Cable For Conveying Data And Power discloses cables for providing electrical power and network data to the devices in a network. U.S. application Ser. No. 12/820,875 published as U.S. Patent Application Publication No. 2010/0319956 and entitled Hybrid Cable For Conveying Data And Power discloses addition cables for providing electrical power and network data to the devices in a network.

U.S. Pat. Nos. 7,940,673 and 7,740,501 and U.S. Patent Application Publication Nos. 2009/0016216, 2011/0176428, 2009/0011639 and 2010/0319956 are hereby incorporated by reference.

SUMMARY

In one aspect thereof, an electrical power and data distribution apparatus comprises an enclosure configured for installation in a wall of a building. The enclosure includes a front surface and a rear surface. A rear power/data connector is mounted on the rear surface of the enclosure and configured to electrically connect to a first hybrid external cable including both electrical power conductors and network data conductors. A front power/data connector is mounted on the front surface of the enclosure and configured to electrically connect to a second hybrid external cable including both electrical power conductors and network data conductors. At least one electrical power outlet is mounted on the front surface of the enclosure and configured to electrically connect to a standard wall outlet power plug. At least one data input/output connector is mounted on the front surface of the enclosure and configured to connect to an external device having a predetermined connection configuration. A power hub is disposed inside the enclosure and operatively connected to the rear power/data connector to receive electrical power therefrom and operatively connected to the front power/data connector and the electrical power outlet to supply electrical power thereto. A controller system is disposed inside the enclosure, the controller system including a processor, a memory, a network interface and an input/output section. The network data conductors of the rear power/data jack and the front power/data jack are operatively connected to the network interface of the controller system for sending and receiving network data therebetween in accordance with a first communication protocol and the data input/output connector is operatively connected to the input/output section of the controller system for sending and receiving data therebetween in accordance with a second communication protocol.

In another aspect thereof, the power hub is connected to the controller system for receiving control signals therefrom and adapted to selectively control the flow of electrical power to the electrical power outlet or to the front power/data connector in response to the control signals received from the controller system.

In another aspect thereof, the data input/output port is a high definition multimedia interface (HDMI) port implementing the EIA/CEA-861 standards.

In another aspect thereof, the data input/output port is a universal serial bus (USB) port implementing the USB standards.

In another aspect thereof, the data input/output port is a RJ-45 jack implementing the Ethernet network communication standards.

In another aspect thereof, the distribution apparatus further comprises a wireless communication module disposed within the enclosure and operatively connected to the controller system for sending and receiving data signals therebetween.

In another aspect thereof, an electrical power and data distribution apparatus comprises an enclosure configured for installation in a wall of a building. The enclosure includes a front surface and a rear surface. A rear electrical power connector is mounted on the rear surface of the enclosure and configured to electrically connect to electrical wall outlet power source. A front power/data connector is mounted on the front surface of the enclosure and configured to electrically connect to a second hybrid external cable including both electrical power conductors and network data conductors. At least one electrical power outlet is mounted on the front surface of the enclosure and configured to electrically connect to a standard wall outlet power plug. At least one data input/output connector is mounted on the front surface of the enclosure and configured to connect to an external device having a predetermined connection configuration. A power hub is disposed inside the enclosure and operatively connected to the rear electrical power connector to receive electrical power therefrom and operatively connected to the front power/data connector and the electrical power outlet to supply electrical power thereto. A wireless communication module is disposed within the enclosure for sending and receiving data communications to/from an external wireless network. A controller system disposed inside the enclosure including a processor, a memory, a network interface and an input/output section. The network data conductors of the front power/data jack are operatively connected to the network interface of the controller system for sending and receiving network data therebetween in accordance with a first communication protocol; the wireless communication module is operatively connected to the controller system for sending and receiving network communications with an external wireless network; and the data input/output connector is operatively connected to the input/output section of the controller system for sending and receiving data therebetween in accordance with a second communication protocol.

In another aspect thereof, the power hub is connected to the controller system for receiving control signals therefrom and adapted to selectively control the flow of electrical power to the electrical power outlet or to the front power/data connector in response to the control signals received from the controller system.

BRIEF DESCRIPTION OF THE DRAWINGS

For a more complete understanding, reference is now made to the following description taken in conjunction with the accompanying Drawings in which:

FIG. 2 is a functional block diagram of the embodiment of FIG. 1a;

FIG. 7 is a functional block diagram of the embodiment of FIG. 6a.

DETAILED DESCRIPTION

Referring now to the drawings, wherein like reference numbers are used herein to designate like elements throughout, the various views and embodiments of an electrical power and data distribution apparatus are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1A:
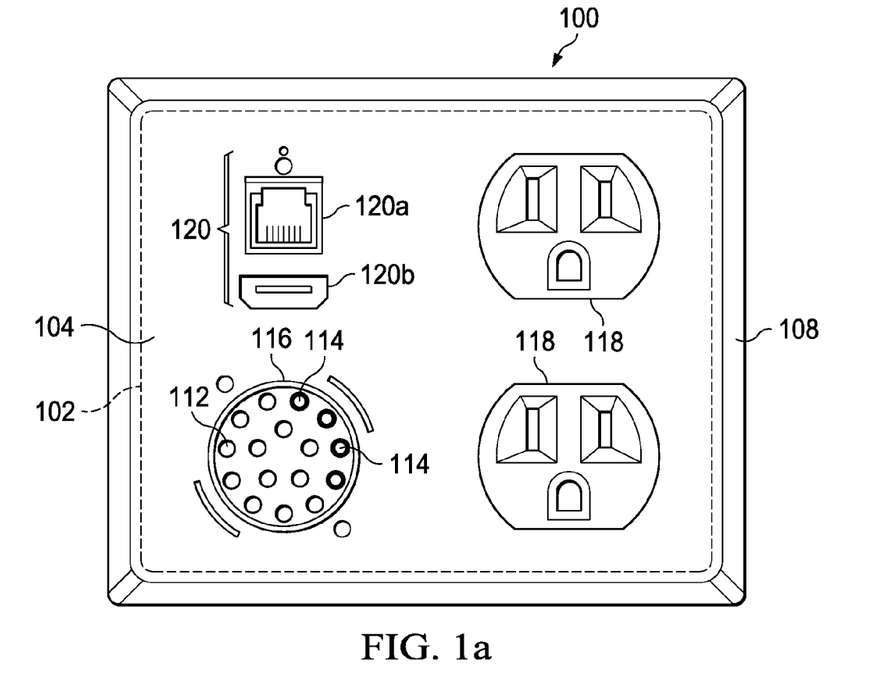
FIGS. 1a, 1b and 1c illustrate an electrical power and data distribution apparatus in accordance with one embodiment, specifically, FIG. 1a being a front view, FIG. 1b being a side view and FIG. 1c being a rear view.
Figure 1B:
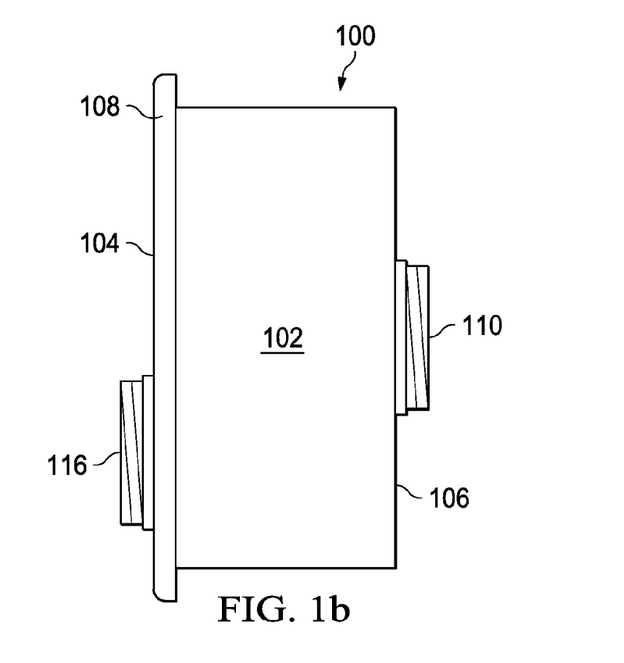
Figure 1C:
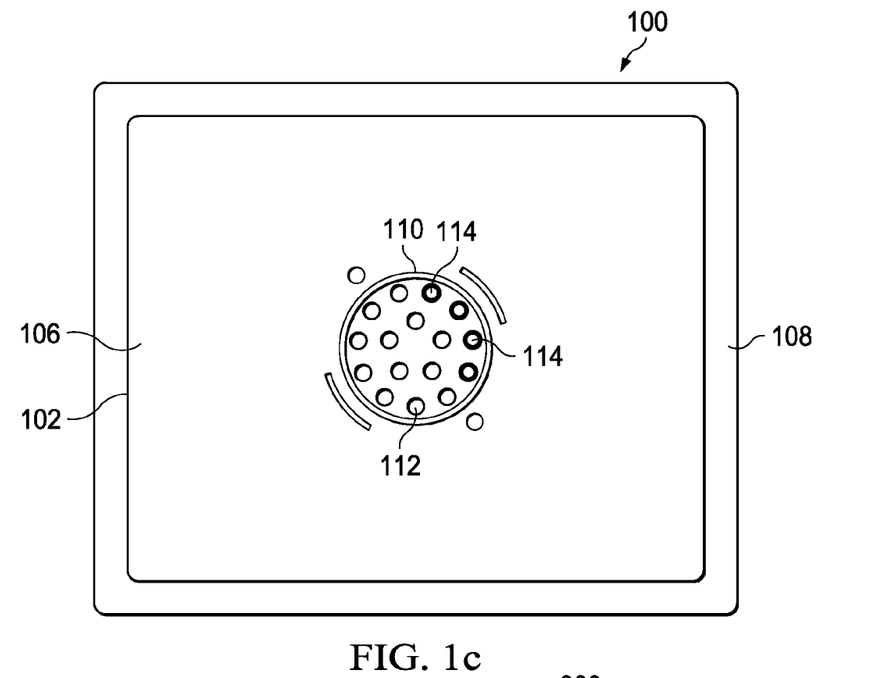

Referring now to FIGS. 1a, 1b and 1c, there is illustrated an electrical power and data distribution apparatus in accordance with one embodiment, specifically, an embodiment designed for recessed or semi-recessed installation in a hollow wall of a residential or commercial building. The distribution apparatus 100 has an enclosure 102 configured for installation in a cutout in a hollow wall using mounting means (not shown) similar to those used for conventional electrical boxes. The enclosure 102 includes a front surface 104 that is typically exposed to the room when the apparatus 100 is mounted in the wall and a rear surface 106 that typically faces the hollow space inside the wall (and thus is hidden from view when mounted). Preferably, the enclosure 102 has dimensions substantially similar to those of conventional electrical boxes. In one such embodiment, the face of the rear surface 106 has dimensions of approximately 4"×4" (width×height) and the depth of the enclosure is approximately 1.5" to 2.5". The front surface 104 may include a removable cover plate 108 having dimensions that are greater than the dimensions of the rear surface 106, thereby covering the mounting hole in the wall. In the case of a rear face 106 having dimensions of approximately 4"×4", the cover plate 108 may have dimensions of approximately 4.6"×4.5" (width×height).

As best seen in FIGS. 1b and 1c, a rear power/data connector (or "jack") 110 is mounted on the rear surface 106 of the enclosure 102 and configured to electrically connect to a first hybrid external cable (not shown) including both electrical power conductors and network data conductors. For purposes of this application, electrical power conductors are conductors carrying electrical voltage and current having no data component/signals used by the subject distribution apparatus; i.e., either the power conductors carry no data components/signals at all (e.g., pure AC or DC power), or the power conductors carry data components/signals that are not utilized by the distribution apparatus. Network data conductors, on the other hand, are any type of conductors carrying network data signals that are utilized by the subject distribution apparatus. Such conductors may be electrical wires carrying electrical signals, optical fibers carrying light signals, or any other type of conductor capable of carrying network data. In the example shown, the rear connector 110 has a round profile and includes twelve power conductor sockets 112 and four network data conductor sockets 114, each corresponding to a separate conductor pin in the associated hybrid cable. In other embodiments, the rear connector 110 may have a different profile, e.g., square, rectangular, trapezoidal, etc., and different pin/socket numbers and configurations, as long as some of the conductors in the connector are power conductors and other conductors in the same connector are network data conductors. In some configurations, the rear power/data connector 110 may be configured to interface with external cables having the configurations disclosed in U.S. Pat. No. 7,740,501 and/or U.S. Patent Application Publication No. 2010/0319956.

As best seen in FIGS. 1a and 1b, a front power/data connector ("jack") 116 is mounted on the front surface 104 of the enclosure 102 and configured to electrically connect to a second hybrid external cable (not shown) including both electrical power conductors and network data conductors. In the example shown, the front power/data connector 116 has a round profile and includes twelve power conductor sockets 112 and four network data conductor sockets 114, each corresponding to a separate conductor pin in the associated hybrid cable. In other embodiments, the front connector 116 may have a different profile, e.g., square, rectangular, trapezoidal, etc., and different pin/socket numbers and configurations, as long as some of the conductors in the connector are power conductors and other conductors in the same connector are network data conductors. The front power/data connector 116 may have a configuration that is identical to the rear power/data connector 110; however, this is not required.

Referring still to FIG. 1a, the distribution apparatus 100 includes least one electrical power outlet 118 mounted on the front surface 104 of the enclosure 102 and configured to electrically connect to a standard wall outlet power plug (not shown). In the example shown in FIG. 1a, two power outlets 118 are provided, and each is configured to accept a standard North American 110 VAC three-prong wall outlet power plug. In other embodiments the power outlet(s) 118 may be configured to accept plugs having other configurations for different voltages, countries or special requirements. If multiple power outlets are provided on a single apparatus 100, the configuration of each power outlet 118 on that apparatus may be the same or different from one another.

The distribution apparatus 100 further includes at least one data input/output connector 120 mounted on the front surface 104 of the enclosure 102 and configured to connect to an external device (not shown) having a predetermined connection configuration. In the example shown in FIG. 1a, two input/output connectors are provided, namely, a first input/output connector (denoted 120a), which is a RJ-45 jack for the connection of Ethernet-compatible network communication devices, and a second input/output connector (denoted 120b), which is a high definition multimedia interface (HDMI) port for connection using the EIA/CEA-861 standards. In other embodiments, input/output connectors 120 may be providing having other configurations, including, but not limited to, USB 1.0, USB 2.0, USB 3.0, Firewire 400, Firewire 800, Thunderbolt (Apple Corp.).

Figure 2:
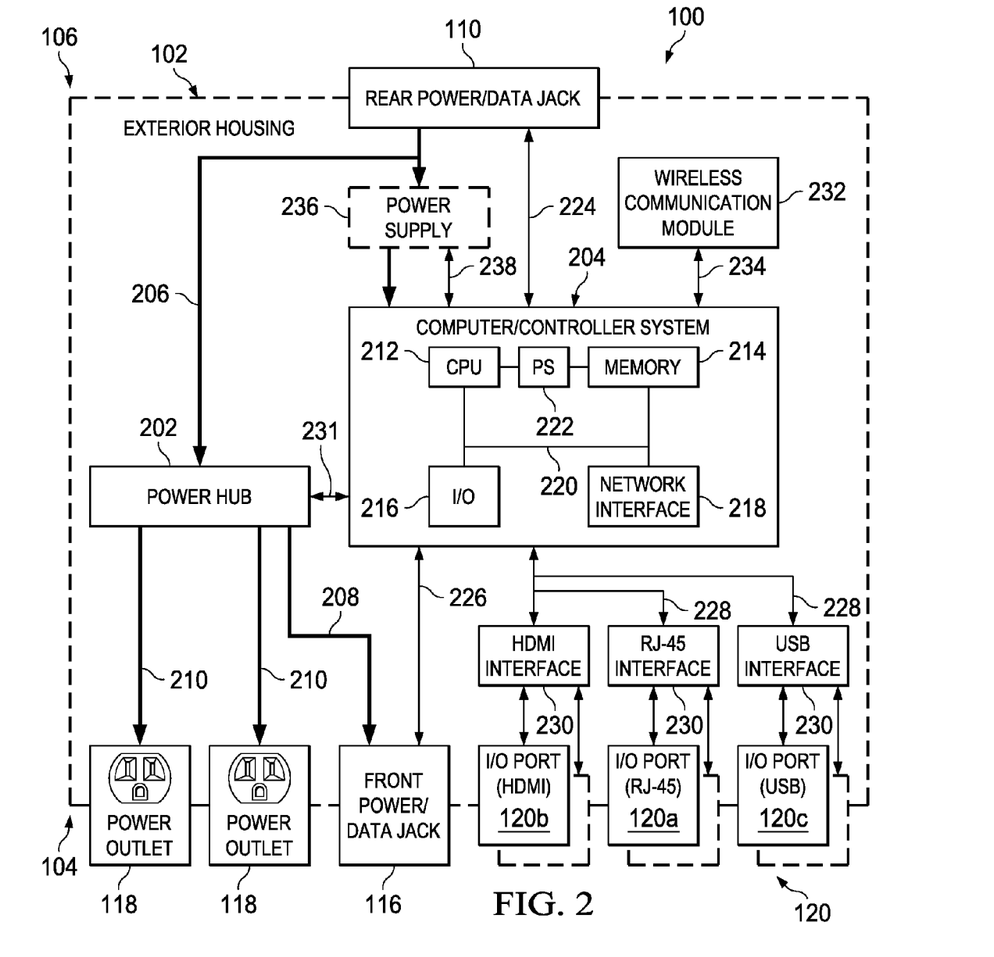

Referring now also to FIG. 2, the internal structure and functional configuration of the distribution apparatus 100 is disclosed. Disposed inside the enclosure 102 are a power hub 202 and a computer (or "controller") system 204. The power hub 202 is operatively connected to the rear power/data connector 110 to receive electrical power therefrom (denoted by arrow 206) and operatively connected to the front power/data connector 116 and the power outlets 118 to supply electrical power thereto (denoted by arrows 208 and 210, respectively). The power hub 202 may supply electrical power to the front power/data connector 116 and power outlets 118 without modifying the character of the power (termed "pass-through") or it may convert the character of the power, e.g., by changing the voltage level, by full-wave or half-wave rectification, etc. to some or all of the connectors/outlets.

Referring still to FIG. 2, the controller system 204 controls the local operation of the distribution apparatus 100. The controller system 204 may function according to dedicated programming (e.g., on-board firmware) and/or in response to instructions received over the associated digital communication network. The controller system 204 may include a central processing unit ("CPU") 212, a memory unit 214, an input/output ("I/O") device 216, and a network interface 218. The components 212, 214, 216, and 218 are interconnected by a transport system (e.g., a bus) 220. A dedicated power supply ("PS") 222 may provide power to components of the controller system 204, such as the CPU 212 and memory unit 214. It is understood that the controller system 204 may be differently configured in different embodiments, and that each of the listed components may actually represent multiple components. For example, the CPU 212 may actually represent a micro-controller, microprocessor, multi-processor or a distributed processing system; the memory unit 214 may include different levels of cache memory, main memory, hard disks, and remote storage locations; the I/O device 216 may include analog, digital, analog-to-digital and digital-to-analog circuitry for interfacing with components inside and outside the enclosure; and the network interface 218 may include one or more network cards providing one or more connections (wired and/or wireless) to various digital communication networks. Therefore, a wide range of flexibility is anticipated in the configuration of the controller system 204.

The controller system 204 may use any operating system (or multiple operating systems), including various versions of operating systems provided by Microsoft Corp. (e.g., WINDOWS), Apple Corp. (e.g., Mac OS X and iOS), UNIX, and LINUX, and may include operating systems specifically developed for handheld devices, personal computers, and servers depending on the use of the controller system 204. The operating system, as well as other instructions, may be stored in the memory unit 214 and executed by the CPU 212. As previously indicated, the controller system 204 illustrated in FIG. 2 is just one possible example; many other configurations are possible.

The network data conductors 114 of the rear power/data jack 110 and the front power/data jack 116 are operatively connected (denoted by arrows 224 and 226, respectively) to the controller system 204 (e.g., via the network interface 218) for sending and receiving network data in accordance with a first communication protocol or standard. Thus, the controller system 204 is able to communicate with network devices connected to the rear power/data jack 110 and/or the front power/data jack 116, and further facilitates network communication between devices connected to the power/data jacks, all using a first network communication standard, e.g., Ethernet. Each of the data input/output connectors 120 is also operatively connected (denoted by arrows 228) to the controller system 204 (e.g., via the input/output section 216) for sending and receiving data therebetween. The communication between the controller system 204 and the input/output connectors 120 may be in accordance with the same (i.e., first) communication standard used for the front and rear power/data connectors 116, 110, and/or it may be in accordance with a second communication protocol or standard. In the example illustrated in FIG. 2, the controller system 204 may communicate with the first input/output connector 120a using the first network communication standard, e.g., Ethernet, communicate with a second input/output connector 120b using the HDMI communication standard, and communicate with a third input/output connector 120c (FIG. 5) using the USB communication standard. In some embodiments, communication (including, but not limited to, signal conditioning, coding and decoding) between the controller system 204 and the input/output connectors 120a, 120b and 120c may be conducted by the controller system alone, while in other embodiments the communication may be facilitated by dedicated standard-specific interface circuitry 230a, 230b and 230c, respectively, disposed on one or more of the communication paths.

Optionally, the power hub 202 may be operatively connected (denoted by arrow 231) to receive control signals from the controller system 204, and adapted to selectively control the flow of electrical power to the electrical power outlets 118 and/or to the front power/data connector 116 in response to the control signals received from the controller system. In this context, controlling the flow of electrical power includes, but is not limited to: turning the flow of power on and off; changing the voltage supplied; and limiting the maximum current provided.

The apparatus 100 may further comprise a wireless communication module 232 disposed within the enclosure 102 and operatively connected (denoted by arrow 234) to the controller system 204 to allow wireless network communication to/from the apparatus. Data and instructions received from the wireless communication module 232 may be routed to the wired network via the power/data connectors 110, 116 and/or routed to the data input/output connectors 120 (or vice versa) similar to data and instructions received via the wired network. The wireless communication module may operate according to specifications including, but not limited to: Wireless A (802.11a), Wireless G (802.11g) and Wireless N (802.11n-draft and 802.11n-2009).

Optionally, the apparatus 100 may further comprise a power supply 236 disposed within the enclosure 102 to supply power to the various components, including, but not limited to: the controller system 204, wireless communication module 232 and data input/output connectors 120. The power supplied to the data input/output connectors 120 may include operating and/or charging power for connected devices. The power supply 236 may provide power of a single electrical character (i.e., voltage, waveform, current limit, etc.) or power of different electrical characters. The power supply 236 may embody conventional-type power supplies, including but not limited to: transformers, voltage regulators and switching power supplies. The power supply 236 may be operatively connected (denoted by arrow 238) to the controller system 204 to receive control signals from the controller system, and adapted to selectively change the flow of electrical power provided to the various components in response to the control signals received from the controller system. In this context, controlling the flow of electrical power includes, but is not limited to: turning the flow of power on and off; changing the voltage supplied; and limiting the maximum current provided.

Figure 3A:
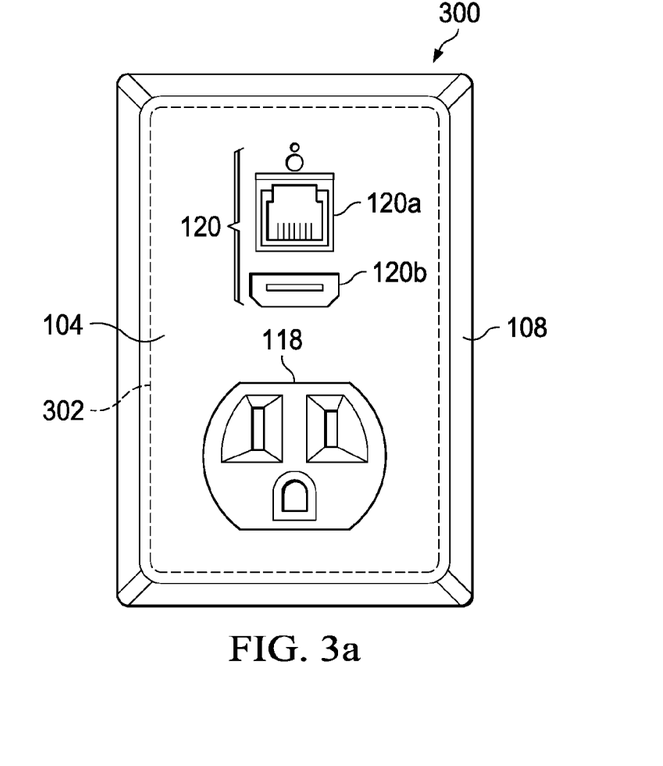
FIGS. 3a, 3b and 3c illustrate an electrical power and data distribution apparatus in accordance with another embodiment, specifically, FIG. 3a being a front view, FIG. 3b being a side view and FIG. 3c being a rear view.
Figure 3B:
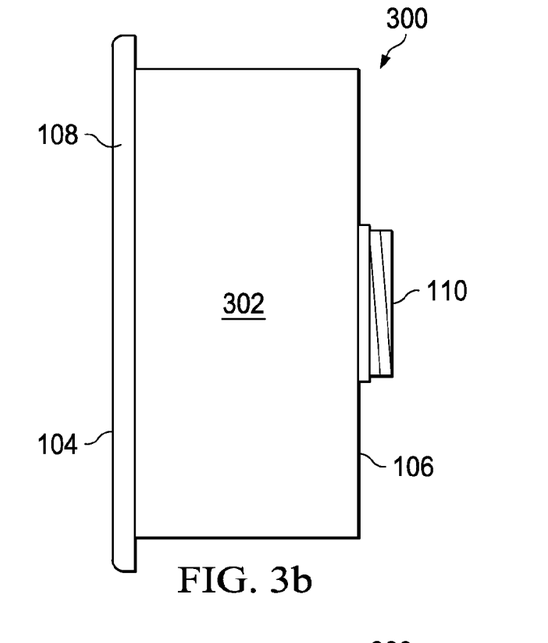
Figure 3C:
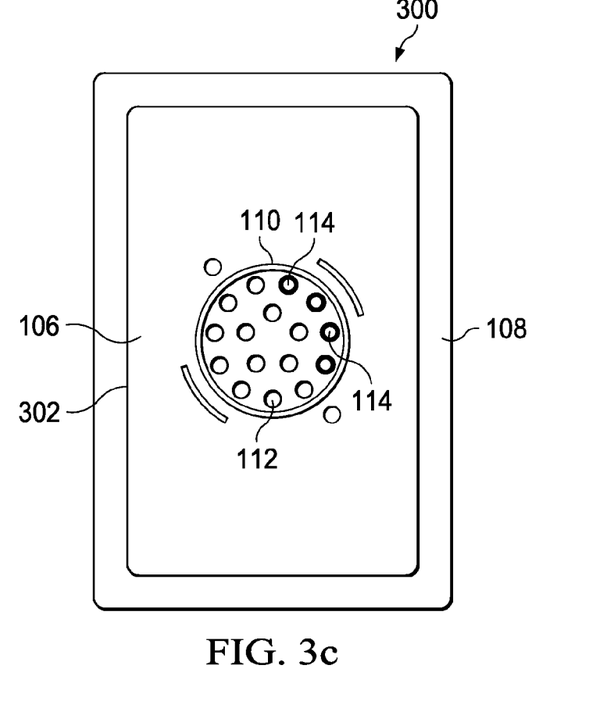

Referring now to FIGS. 3a, 3b and 3c, there is illustrated an electrical power and data distribution apparatus in accordance with another embodiment. The distribution apparatus 300 includes many features substantially similar to those previously described in connection with the distribution apparatus 100 of FIGS. 1a, 1b and 1c. Such features are number as in the previous discussion and will not be described again in details. The enclosure 302 of the distribution apparatus 300 is sized to resemble a "single gang" electrical box having a rear surface 106 with dimensions of approximately 2"×4" (width×height) and a cover plate 108 with dimensions of approximately 2.8"×4.5" (width×height). A rear power/data connector 110 is mounted on the rear surface 106 of the enclosure 102 (FIGS. 3b and 3c). Unlike apparatus 100, however, no front power/data connector 116 is provided on the front surface 104 of the distribution apparatus 300. Instead, mounted on the front surface 104 of the enclosure 302 are a single electrical power outlet 118, a first data input/output connector 120a configured as a RJ-45 jack and a second input/output connector 120b configured as a HDMI port. The internal function of the distribution apparatus may be similar to that illustrated in FIG. 2, but modified in view of the provided connectors. Some embodiments of the distribution apparatus 300 may include the wireless communication module 232 allowing communication with wireless networks, while other embodiments may communicate only via the wired power/data connector 110.

Figure 4:
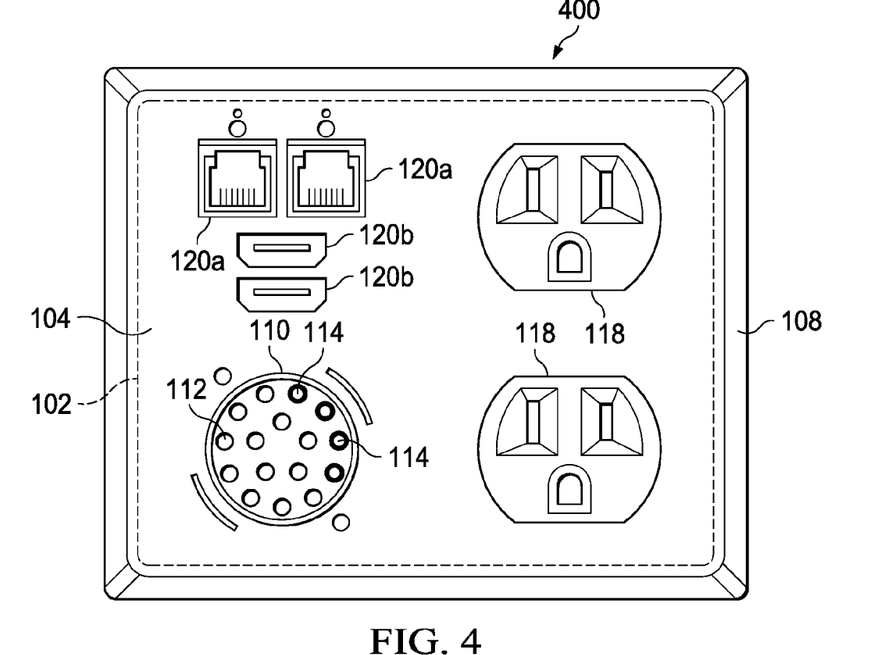
FIG. 4 is a front view of an electrical power and data distribution apparatus in accordance with a yet another embodiment.

Referring now to FIG. 4, there is illustrated an electrical power and data distribution apparatus in accordance with yet another embodiment. The distribution apparatus 400 is substantially similar in many respects to the distribution apparatus 100, including a rear power/data connector 110 mounted on the rear surface of the enclosure (see FIGS. 1b and 1c). However, the distribution apparatus 400 provides additional input/output connectors 120. Specifically, mounted on the front surface 104 of the enclosure 102 are two electrical power outlets 118, two data input/output connectors 120a configured as RJ-45 jacks and two input/output connectors 120b configured as HDMI ports. The internal function of the distribution apparatus 400 may be similar to that illustrated in FIG. 2, but modified in view of the provided connectors. Some embodiments of the distribution apparatus 400 may include the wireless communication module 232 allowing communication with wireless networks, while other embodiments may communicate only via the wired power/data connectors 110 and 116.

Figure 5:
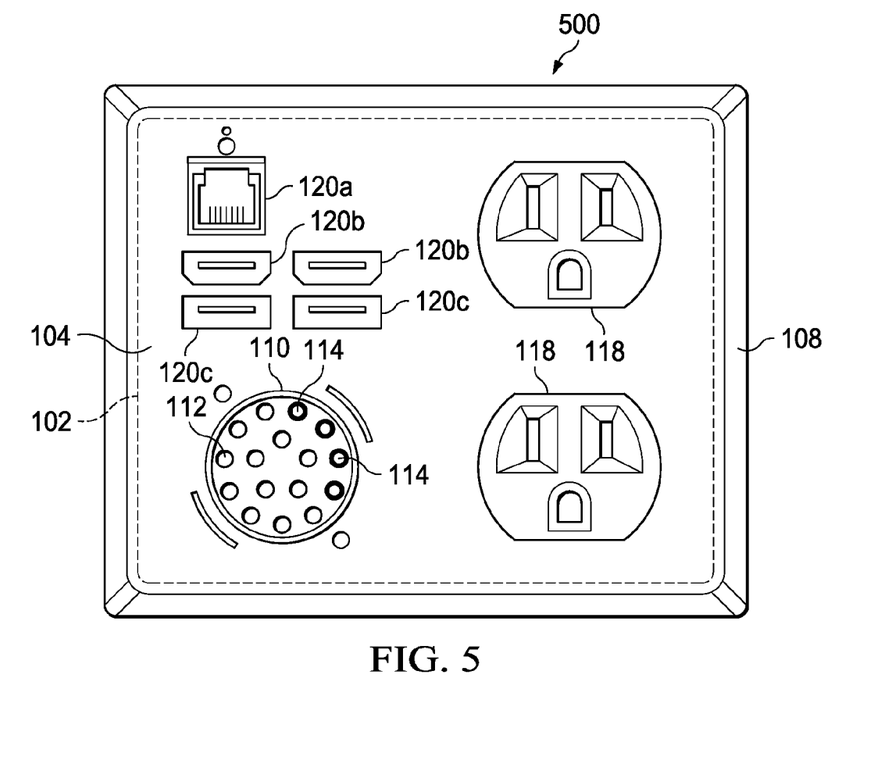
FIG. 5 is a front view of an electrical power and data distribution apparatus in accordance with a further embodiment.

Referring now to FIG. 5, there is illustrated an electrical power and data distribution apparatus in accordance with a further embodiment. The distribution apparatus 500 is substantially similar in many respects to the distribution apparatus 100, including a rear power/data connector 110 mounted on the rear surface of the enclosure (see FIGS. 1b and 1c). However, the distribution apparatus 500 provides a different mix of input/output connectors 120. Specifically, mounted on the front surface 104 of the enclosure 102 are two electrical power outlets 118, one data input/output connectors 120a configured as a RJ-45 jack, two input/output connectors 120b configured as HDMI ports and two input/output connectors 120c configured as USB ports. The internal function of the distribution apparatus 500 may be similar to that illustrated in FIG. 2, but modified in view of the provided connectors. Some embodiments of the distribution apparatus 500 may include the wireless communication module 232 allowing communication with wireless networks, while other embodiments may communicate only via the wired power/data connectors 110 and 116.

Figure 6A:
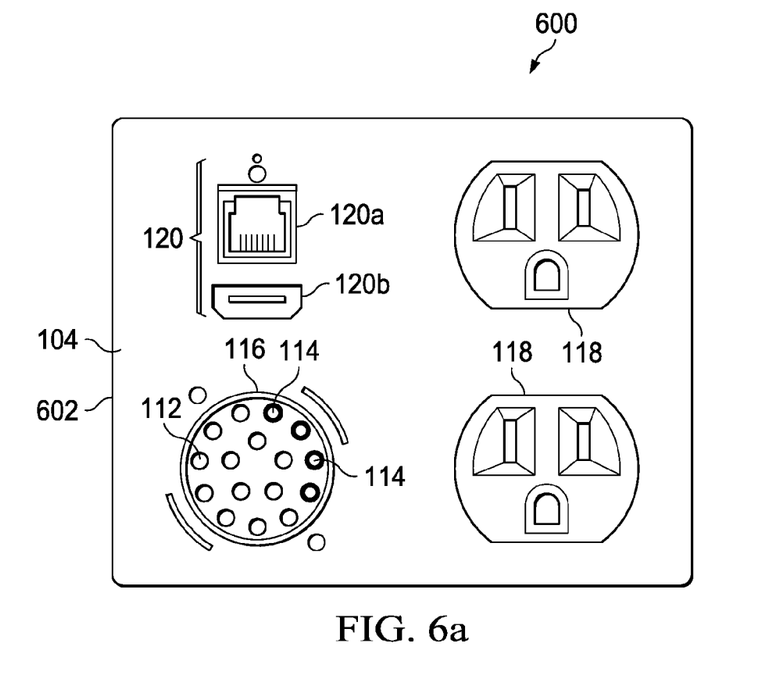
FIGS. 6a, 6b and 6c illustrate an electrical power and data distribution apparatus in accordance with yet another embodiment, specifically, FIG. 6a being a front view, FIG. 6b being a side view and FIG. 6c being a rear view.
Figure 6B:
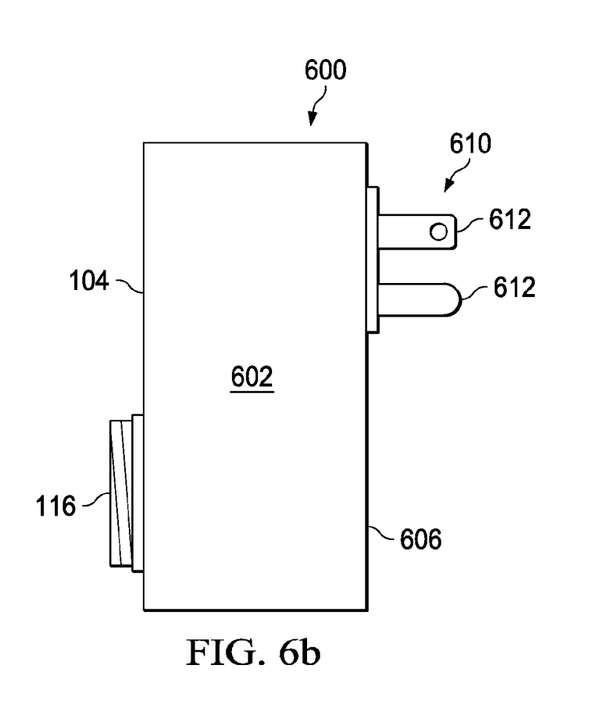
Figure 6C:
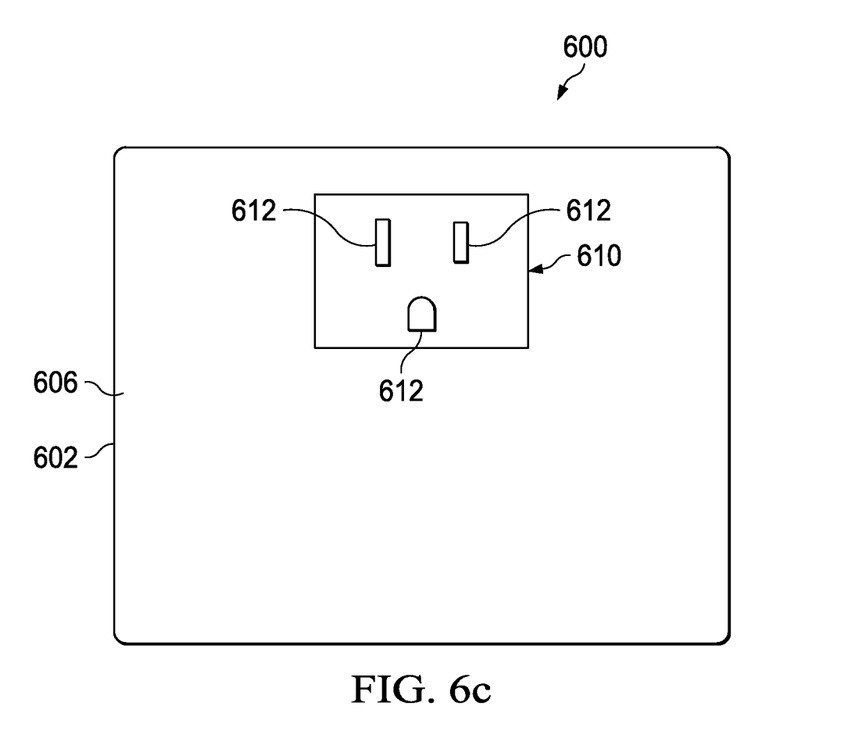

Referring now to FIGS. 6a, 6b and 6c, there is illustrated an electrical power and data distribution apparatus in accordance with another embodiment. The distribution apparatus 600 may be used in buildings having standard AC electrical wiring (wall outlet power or mains power) and a wireless communications network. The distribution apparatus 600 is substantially similar in many respects to the distribution apparatus 100, however, as best seen in FIGS. 6b and 6c, there is no rear power/data connector. Instead, a rear electrical power connector 610 configured as a standard wall outlet-style plug 612 is mounted on the rear surface 606 of the enclosure 602, and operatively connected as further described below (see FIG. 7). The rear electrical power connector 610 is adapted to receive ordinary electrical power (i.e., wall power or mains power), not network data for use by the distribution apparatus 600. In addition, the rear electrical power connector 610 serves to physically support the apparatus 600 when it is plugged in to a wall outlet. In the example shown, the rear electrical power connector 610 is configured as a standard North American 110 VAC three-prong wall outlet power plug. In other embodiments the power connector 610 may be configured to the prong dimension standards for different voltages, countries or special requirements. In yet other embodiments, an electric power cord (not shown) extending from the enclosure 602 may be provided, and the power connector 610 may be mounted on the end of the power cord rather than directly on the rear of the enclosure.

As best seen in FIG. 6a, the front surface 104 of the distribution apparatus 600 is similar to that of distribution apparatus 100; mounted thereon are a front power/data connector 116, at least one electrical power outlet 118 and at least one data/input output connector 120. In the example shown in FIG. 6a, two electrical power outlets 118, one data input/output connector 120a configured as a RJ-45 jack, and one input/output connector 120b configured as a HDMI port are provided.

Figure 7:
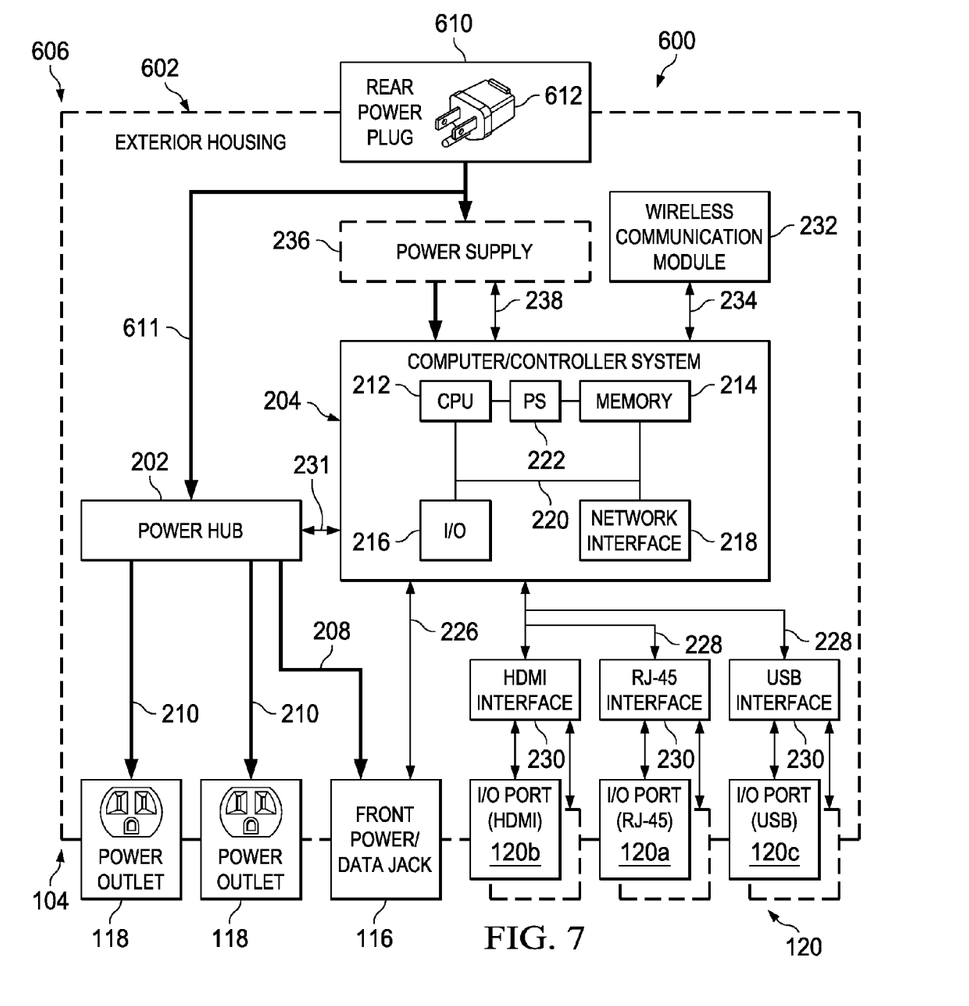

Referring now to FIG. 7, the internal structure and functional configuration of the distribution apparatus 600 is disclosed. Disposed inside the enclosure 602 are a power hub 202, a computer/controller system 204 and a wireless communication module 232. The power hub 202 is operatively connected (denoted by arrow 611) to the rear electrical power connector 610 to receive electrical power therefrom and operatively connected to the front power/data connector 116 and the power outlets 118 to supply electrical power thereto (denoted by arrows 208 and 210, respectively). As in previous embodiments, the power hub 202 may supply electrical power to the front power/data connector 116 and power outlets 118 without modifying the character of the power or it may convert the character of the power.

Referring still to FIG. 7, the wireless communication module 232 is operatively connected (denoted by arrow 234) to the controller system 204 to send and receive data therebetween, such data including data network communications. The wireless communication module 232 may operate according to specifications including, but not limited to: Wireless A (802.11a), Wireless G (802.11g) and Wireless N (802.11n-draft and 802.11n-2009). Data and instructions received from the wireless communication module 232 may be routed to the wired network via the power/data connector 116 and/or routed to the data input/output connectors 120 (or vice versa) similar to data and instructions received via the wired network.

The controller system 204 of the distribution apparatus 600 may include a CPU 212, a memory unit 214, an I/O device 216, and a network interface 218. The components 212, 214, 216, and 218 may be interconnected by a bus 220. A dedicated power supply 222 may provide power to components of the controller system 204, such as the CPU 212 and memory unit 214. The network data conductors 114 (FIG. 6) of the front power/data jack 116 are operatively connected (denoted by arrow 226) to the controller system 204 for sending and receiving network data in accordance with a first communication protocol or standard. Thus, the controller system 204 is able to communicate with network devices connected to the front power/data jack 116 using a first network communication standard, e.g., Ethernet. This allows network data received from a wireless network by the wireless communication module 232 (and the controller system 204) to be communicated onto the wired network via power/data jack 116, and vice versa.

Each of the data input/output connectors 120 on the distribution apparatus 600 is operatively connected to the controller system 204 for sending and receiving data therebetween. The communication between the controller system 204 and the input/output connectors 120 may be in accordance with the first communication standard used for the front power/data connector 116, and/or it may be in accordance with a second communication protocol or standard. In the example illustrated in FIG. 7, the controller system 204 may communicate with the first input/output connector 120a using the first network communication standard, e.g., Ethernet, communicate with a second input/output connector 120b using the HDMI communication standard, and communicate with a third input/output connector 120c (FIG. 5) using the USB communication standard. This allows network data received from a wireless network by the wireless communication module 232 and the controller system 204 to be communicated to external devices via the data input/output connectors 120, and vice versa. External devices connected via the data input/output connectors 120 may also communicate network data to the wired network via the front power/data connector 116 as previously described. The remaining functionality of the distribution apparatus 600 is similar to that previously described for apparatus 100, 300, etc.

It will be appreciated by those skilled in the art having the benefit of this disclosure that this electrical power and data distribution apparatus provides improved data and/or electrical power connectivity to many electrical devices. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

The invention claimed is:

1. An electrical power and data distribution apparatus comprising:
an enclosure configured for installation in a wall of a building, the enclosure including a front surface and a rear surface;
a rear power/data connector mounted on the rear surface of the enclosure and configured to electrically connect to a first hybrid external cable including both electrical power conductors and network data conductors;
a front power/data connector mounted on the front surface of the enclosure and configured to electrically connect to a second hybrid external cable including both electrical power conductors and network data conductors;
at least one electrical power outlet mounted on the front surface of the enclosure and configured to electrically connect to a standard wall outlet power plug;
at least one data input/output connector mounted on the front surface of the enclosure and configured to connect to an external device having a predetermined connection configuration;
a power hub disposed inside the enclosure and operatively connected to the rear power/data connector to receive electrical power therefrom and operatively connected to the front power/data connector and the at least one electrical power outlet to supply electrical power thereto;
a controller system disposed inside the enclosure including a processor, a memory, a network interface and an input/output section; and
wherein the network data conductors of the rear power/data jack and the front power/data jack are operatively connected to the network interface of the controller system for sending and receiving network data therebetween in accordance with a first communication protocol and the at least one data input/output connector is operatively connected to the input/output section of the controller system for sending and receiving data therebetween in accordance with a second communication protocol.

2. The electrical power and data distribution apparatus of claim 1, wherein the power hub is connected to the controller system for receiving control signals therefrom and adapted to selectively control the flow of electrical power to the at least one electrical power outlet or to the front power/data connector in response to the control signals received from the controller system.

3. The electrical power and data distribution apparatus of claim 1, wherein the data input/output port is a high definition multimedia interface (HDMI) port implementing the EIA/CEA-861 standards.

4. The electrical power and data distribution apparatus of claim 1, wherein the data input/output port is a universal serial bus (USB) port implementing the USB standards.

5. The electrical power and data distribution apparatus of claim 1, wherein the data input/output port is a RJ-45 jack implementing the Ethernet network communication standards.

6. The electrical power and data distribution apparatus of claim 1, further comprising a wireless communication module disposed within the enclosure and operatively connected to the controller system for sending and receiving data signals therebetween.

7. An electrical power and data distribution apparatus comprising:

an enclosure configured for installation in a wall of a building, the enclosure including a front surface and a rear surface;

a rear electrical power connector mounted on the rear surface of the enclosure and configured to electrically connect to electrical wall outlet power source;

a front power/data connector mounted on the front surface of the enclosure and configured to electrically connect to a second hybrid external cable including both electrical power conductors and network data conductors;

at least one electrical power outlet mounted on the front surface of the enclosure and configured to electrically connect to a standard wall outlet power plug;

at least one data input/output connector mounted on the front surface of the enclosure and configured to connect to an external device having a predetermined connection configuration;

a power hub disposed inside the enclosure and operatively connected to the rear electrical power connector to receive electrical power therefrom and operatively connected to the front power/data connector and the at least one electrical power outlet to supply electrical power thereto;

a wireless communication module disposed within the enclosure for sending and receiving data communications to/from an external wireless network;

a controller system disposed inside the enclosure including a processor, a memory, a network interface and an input/output section; and wherein the network data conductors of the front power/data jack are operatively connected to the network interface of the controller system for sending and receiving network data therebetween in accordance with a first communication protocol, the wireless communication module is operatively connected to the controller system for sending and receiving network communications with an external wireless network, and the at least one data input/output connector is operatively connected to the input/output section of the controller system for sending and receiving data therebetween in accordance with a second communication protocol.

8. The electrical power and data distribution apparatus of claim 7, wherein the power hub is connected to the controller system for receiving control signals therefrom and adapted to selectively control the flow of electrical power to the at least one electrical power outlet or to the front power/data connector in response to the control signals received from the controller system.

* * * * *